United States Patent
Law et al.

(10) Patent No.: US 8,224,315 B2
(45) Date of Patent: Jul. 17, 2012

(54) CONTROLLING THE USE OF ACCESS POINTS IN A TELECOMMUNICATION SYSTEM

(75) Inventors: Alan Law, Basingstoke (GB); Paul Edwards, Newbury (GB)

(73) Assignee: Vodafone Intellectual Property Licensing Limited, Berkshire (GB)

( * ) Notice: Subject to any disclaimer, the term of this patent is extended or adjusted under 35 U.S.C. 154(b) by 202 days.

(21) Appl. No.: 12/311,413

(22) PCT Filed: Oct. 18, 2007

(86) PCT No.: PCT/GB2007/003927
§ 371 (c)(1),
(2), (4) Date: May 3, 2010

(87) PCT Pub. No.: WO2008/047124
PCT Pub. Date: Apr. 24, 2008

(65) Prior Publication Data
US 2010/0240369 A1    Sep. 23, 2010

(30) Foreign Application Priority Data
Oct. 19, 2006 (GB) .................................. 0620850.8

(51) Int. Cl.
*H04W 36/00* (2009.01)
(52) U.S. Cl. ...................... 455/424; 455/436; 455/435.1; 370/331
(58) Field of Classification Search .................. 455/423, 455/452.2, 513, 67.11, 67.13, 524, 525, 433, 455/436, 421, 411, 435.1, 115.3, 438, 439, 455/443, 444, 445, 446, 456.5, 432.3, 434, 455/435.2, 442; 370/331, 332
See application file for complete search history.

(56) References Cited

U.S. PATENT DOCUMENTS 6,628,958 B1 *   9/2003   Kamel et al. .................. 455/522
(Continued)

FOREIGN PATENT DOCUMENTS
WO    WO02/01892 A2    1/2002

OTHER PUBLICATIONS

3GPP TS 23.236 V6.3.0 (Mar. 2006), Technical Specification, 3rd Generation Partnership Project; Technical Specification Group Services and System Aspects; Intra-domain connection of Radio Access Network (RAN) nodes to multiple Core Network (CN) nodes (Release 6), 37 pp.

*Primary Examiner* — Kamran Afshar
*Assistant Examiner* — Kenneth Corbin
(74) *Attorney, Agent, or Firm* — Muirhead and Saturnelli, LLC

(57) ABSTRACT

A mobile telecommunications network includes a radio access network with base stations and one or more additional access points. An access point is connected to a network core by an IP transport broadband connection. The access point is configured to appear to a mobile terminal as a conventional base station—that is, for example, it communicates with the mobile terminal using GSM or UMTS transport protocols and does not require any modification to a standard GSM or UMTS mobile terminal. Arrangements are disclosed which monitor the quality of the broadband connection between the access point and the network core and which cause the mobile terminal to handover to a neighboring base station in the event that the quality of the broadband connection becomes too poor for the class of communication between the mobile terminals registered with the access point to be performed satisfactorily.

10 Claims, 2 Drawing Sheets

U.S. PATENT DOCUMENTS

| | | | |
|---|---|---|---|
| 7,626,975 B2 * | 12/2009 | Colban et al. | 370/350 |
| 2002/0085516 A1 | 7/2002 | Bridgelall | |
| 2003/0165124 A1 | 9/2003 | Alperovich et al. | |
| 2003/0186694 A1 * | 10/2003 | Sayers et al. | 455/426.1 |
| 2005/0059400 A1 | 3/2005 | Jagadeesan et al. | |
| 2008/0305792 A1 * | 12/2008 | Khetawat et al. | 455/435.1 |

* cited by examiner

CONTROLLING THE USE OF ACCESS POINTS IN A TELECOMMUNICATION SYSTEM

FIELD OF THE INVENTION

This application relates to a telecommunications network including a radio access network for wirelessly transmitting between a mobile telecommunications device and a base station. This application also relates to a method of changing a base station with which a mobile telecommunications device is registered.

BACKGROUND TO THE INVENTION

There have recently been proposals to allow access to the features and services provided by GSM and UMTS networks other than by accessing those networks in the conventional manner by signalling between the mobile terminal and a conventional base station (macro base station) that has a dedicated connection to an MSC and provides coverage in the cell occupied by the mobile terminal using cellular telecommunication (e.g. GSM or UMTS) communication transport protocols. It has been proposed to increase network capacity by providing additional special base stations (femto base stations), referred to as access points (APs), for example at a subscriber's home.

Communications between the access point and the network are IP based communications, and may be, for example, transmitted over a broadband IP network (and routed via the Internet). However, the quality of such broadband IP connections are variable, and not under the control of the telecommunications network provider.

SUMMARY OF THE INVENTION

According to the system described herein, a method of changing the base station with which a mobile terminal is registered includes varying the quality of the signals transmitted to a mobile telecommunications device by the base station to simulate a reduction in quality of the received signal at the mobile telecommunications device.

Changing of the base stations with which a mobile terminal is registered in a conventional GSM or UMTS mobile telecommunications network is preformed by a handover procedure defined in the Standards. However, when a base station is not a conventional base station but an access point (for example, connected to the GSM or UMTS mobile telecommunications network core via a broadband IP network), additional challenges arise. The quality of the connection to the GSM or UMTS mobile telecommunications network core is variable. In accordance with the system described herein, by varying the quality of the signals transmitted to a mobile telecommunications device by the base station (e.g. access point) to simulate a reduction in quality of the received signal at the mobile telecommunications device, the base station can cause a handover to another base station. This may be advantageous if it is determined that the connection to the GSM or UMTS mobile telecommunications network core is poor.

To achieve this forced mobile behaviour the transmit power of the base station may be varied, or the signal may be artificially (deliberately) distorted prior to transmission by the base station.

According further to the system described herein, a telecommunications network includes a radio access network comprising a plurality of base stations for wirelessly transmitting data between a mobile telecommunications device and the base stations, wherein some of the base stations are connected by cellular telecommunications transport to the network and some of the base stations are connected by IP transport to the network, and wherein the IP transport connected base stations monitor the quality of the IP transport connection to the network and are configured to cause the mobile telecommunications devices to de-register with them when the quality of the IP transport connection is poor.

In the embodiments, the mobile telecommunications devices that are caused to de-register with the IP transport connected base stations re-register with cellular telecommunications transport connected base stations.

The IP transport connected base stations may cause the mobile telecommunications devices to de-register with them by varying the transmit power of the base station, or the IP transport connected base stations may cause the mobile telecommunications devices to de-register by distorting signals prior to transmission of those signals by the base station to the mobile telecommunications device. This apparent reduction in radio quality will be sensed by the mobile terminal and will tend to cause handover to another base station.

The IP transport connected base stations may monitor the class of communication occurring between a mobile telecommunications device and the network for the purpose of deciding when to cause the mobile telecommunications device to de-register. Some communications between the mobile terminal and the core network are more time critical than others. There are four different quality of service (QoS) classes, or traffic classes, in UMTS:
1. Conversational class
2. Streaming class
3. Interactive class
4. Background class If a low time-critical class of communication is occurring, then a lower quality of the IP transport connection to the network may be tolerated before causing handover.

The IP transport connection to the network may comprise a DSL broadband connection.

BRIEF DESCRIPTION OF THE DRAWINGS

Embodiments of the system described herein will now be explained, by way of example, with reference to the accompanying drawings, in which.

In the drawings like elements are generally designated with the same reference sign.

DETAILED DESCRIPTION OF VARIOUS EMBODIMENTS

Figure 1:
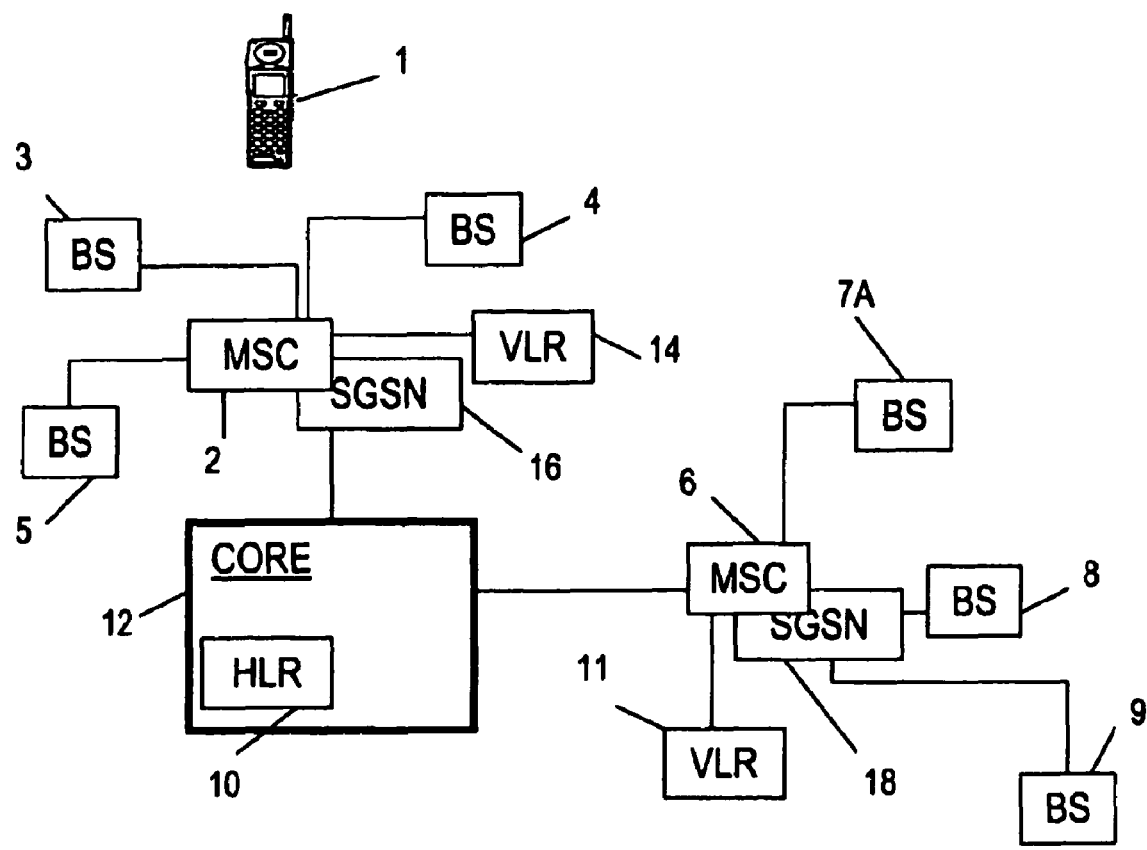
FIG. 1 is a diagrammatic drawing of certain elements of a mobile telecommunications network for use in explaining the operation of such a network.

Certain elements of a mobile telecommunications network, and its operation, will now briefly be described with reference to FIG. 1.

Each base station (BS) corresponds to a respective cell of its cellular or mobile telecommunications network and receives calls from and transmits calls to a mobile terminal in that cell by wireless radio communication in one or both of the circuit switched or packet switched domains. Such a subscriber's mobile terminal is shown at 1. The mobile terminal may be a handheld mobile telephone, a personal digital assistance (PDA) or a laptop computer equipped with a datacard.

In a GSM mobile telecommunications network, each base station comprises a base transceiver station (BTS) and a base station controller (BSC). A BSC may control more than one BTS. The BTSs and BSCs comprise the radio access network.

In a UMTS mobile telecommunications network, each base station comprises a node B and a radio network controller (RNC). An RNC may control more than one node B. The node B's and RNC's comprise the radio access network.

Conventionally, the base stations are arranged in groups and each group of base stations is controlled by one mobile switching centre (MSC), such as MSC 2 for base stations 3,4 and 5. As shown in FIG. 1, the network has another MSC 6, which is controlling a further three base stations 7,8 and 9. In practice, the network will incorporate many more MSCs and base stations than shown in FIG. 1. The base stations 3,4,5,7,8 and 9 each have dedicated (not shared) connection to their MSC2 or MSC6—typically a cable connection. This prevents transmission speeds being reduced due to congestion caused by other traffic.

Each subscriber to the network is provided with a smart card or SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR) 10 which, for each subscriber to the network, stores the IMSI and the corresponding MSISDN together with other subscriber data, such as the current or last known location of the subscriber's mobile terminal.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. In a traditional network, the base station 3 then transmits this IMSI to the MSC 2 with which the BS 3 is registered. In a network using the functionality described in 3GPP TS 23.236, the base station follows prescribed rules to select which MSC to use, and then transmits this IMSI to the selected MSC.

MSC 2 now accesses the appropriate location in the HLR 10 present in the network core 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC.

When the HLR 10 is interrogated by the MSC 2 in the manner described above, the HLR 10 additionally performs an authentication procedure for the mobile terminal 1. The HLR 10 transmits authentication data to the MSC 2 in "challenge" and "response" forms. Using this data, MSC 2 passes a "challenge" to the mobile terminal 1 through base station 3. Upon receipt of this data, the mobile terminal 1 passes this data to its SIM and produces a "response". This response is generated using an encryption algorithm on the SIM and a unique Ki on the SIM. The response is transmitted back to the MSC 2 which checks it against its own information for the subscriber which checks it against information that it has obtained for that subscriber from the HLR 10 in order to complete the authentication process. If the response from the mobile terminal 1 is as expected, the mobile terminal 1 is deemed authenticated. At this point the MSC 2 requests subscription data from the HLR 10. The HLR 10 then passes the subscription data to the VLR 14.

The authentication process will be repeated at regular intervals while the mobile terminal 1 remains activated and can also be repeated each time the mobile terminal makes or receives a call, if required.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal and the SIM has been authenticated in the manner described, a call may be made by entering the telephone number of the called party in the usual way. This information is received by the base station 3 and is then routed to the called party via the MSC 2. By means of the information held in the VLR 14, MSC 6 can associate the call with a particular subscriber and thus record information for charging purposes.

The MSCs 2 and 6 support communications in the circuit switched domain—typically voice calls. Corresponding SGSNs 16 and 18 are provided to support communications in the packet switched domain—such as GPRS data transmissions. The SGSNs 16 and 18 function in an analogous way to the MSCs 2 and 6. The SGSNs 16, 18 are equipped with an equivalent to the VLR for the packet switched domain.

From the description above, it will be understood that the coverage area of a mobile telecommunications network is divided into a plurality of cells, each of which is served by a respective base station. In order to allow a mobile terminal to maintain a call when the mobile terminal moves outside the coverage area of a cell, the call must be switched to an alternative cell automatically. The call must be routed to the new cell before handover can be effected whilst maintaining the connection with the old cell until the new connection is known to have succeeded. Handover is a time critical process requiring action to be taken before the radio link with the original cell degrades to such an extent that the call is lost. Handover requires synchronisation of events between the mobile terminal and the network.

Handover between two cells served by the same MSC is relatively straightforward. The handover process is more complex when a mobile terminal moves between a first cell served by a first MSC and a second cell served by a second MSC. The VLRs of the MSCs and the HLR additionally have to be updated to reflect that the mobile terminal is now in a cell served by the second MSC.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signalling capacity within the network.

However, if the HLR is to always have an up-to-date record of the cell in which each mobile terminal is located so that the current cell is occupied by a terminal is always know, this will require a large amount of location updating signalling between the mobile terminal and the HLR in order that the HLR has up-to-date records of the cells occupied by each mobile terminal. This is also wasteful of valuable signalling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner by dividing the coverage area of the mobile telecommunications network into a plurality of location areas (LAs) and into a plurality of routing areas (RAs).

A location area relates to a particular geographical area for communications in the circuit-switched domain. Typically, although not necessarily, a location area is larger than the area of a single cell but is smaller than the area covered by one MSC. Each cell within the network broadcasts data indicative of the identity of its location area. The mobile terminal uses this data to determine when it moves into a new location area. The terminal stores its last known location area on its SIM. This information stored on the SIM is compared with the location area information broadcast by the local cell. The identities of the two location areas are compared. If they are different, the mobile terminal determines that it has entered a new location area. The mobile terminal then gains access to a radio channel and requests a location update. If the MSC/VLR is the same for the new and old location areas, the network can immediately authenticate the mobile terminal and note the change of location area. However, if the mobile terminal is moved to a different MSC/VLR, the MSC/VLR addresses a message to the HLR. The HLR notes the new location and downloads security parameters to allow the network to authenticate the mobile. It also passes on subscription details of the user to the new VLR and informs the old VLR to delete its records.

A routing area relates to a particular geographical area for communications in the packet-switched domain. Typically, although not necessarily, a routing area is larger than the area of a single cell but is smaller than the area covered by one SGSN. A routing area is typically, although not necessarily, smaller than a location area. There may be many routing areas within one location area. Each cell within the network broadcasts data indicative of its routing area (in addition to the data mentioned above indicative of the identity of its location area). The mobile terminal uses this received data to determine when it moves to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update.

There have recently been proposals to allow access to the features and services provided by GSM and UMTS networks other than by accessing those networks in the conventional manner by signalling between the mobile terminal and a conventional base station (macro base station) that has a dedicated connection to an MSC and provides coverage in the cell occupied by the mobile terminal using cellular telecommunication (e.g. GSM or UMTS) communication transport protocols. It has been proposed to increase network capacity by providing additional special base stations (micro base stations), referred to as access points (APs), for example at a subscriber's home.

Figure 2:
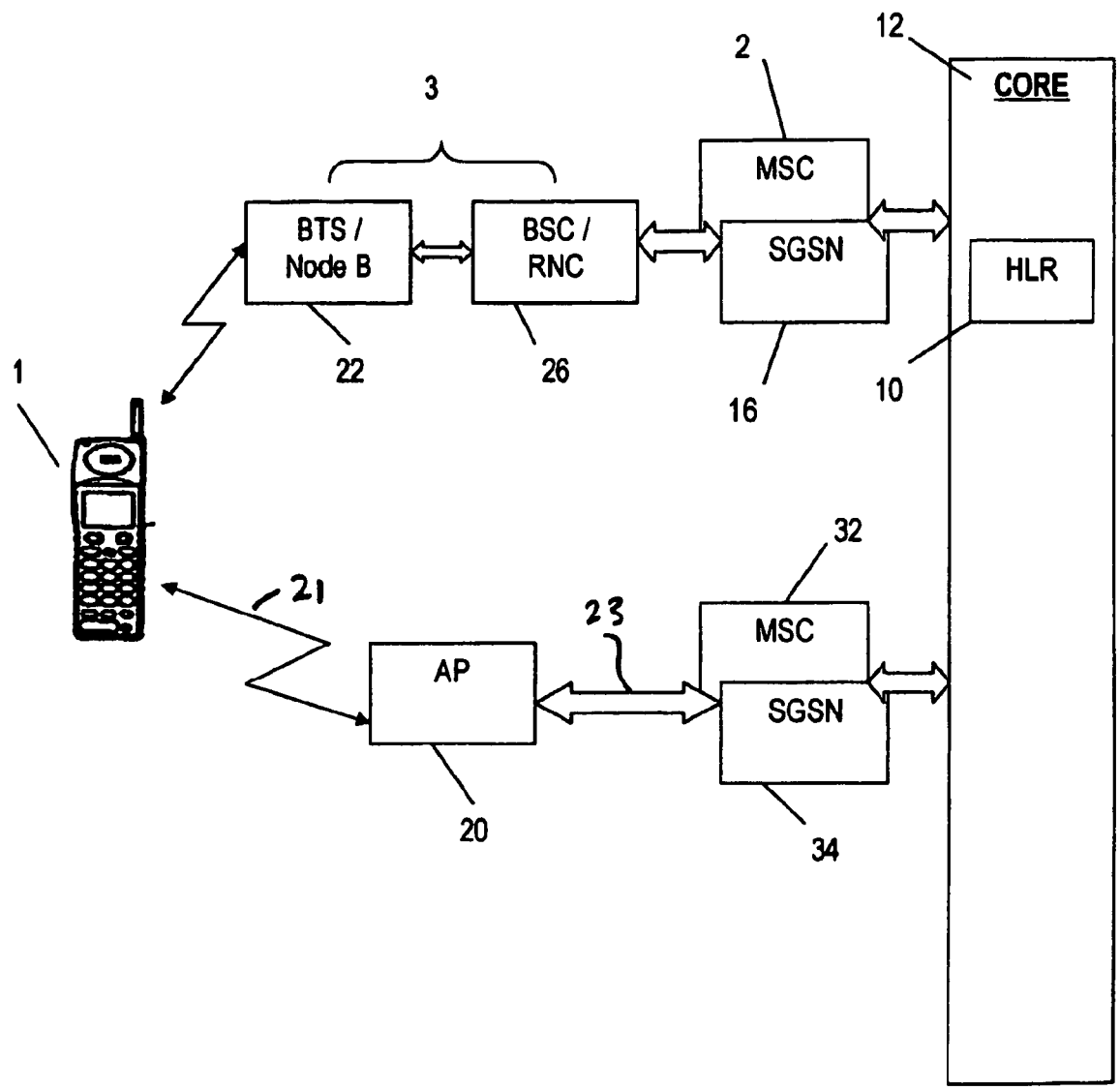
FIG. 2 shows a modified mobile telecommunications network for receiving IP based communications from an access point in addition to communications from a conventional base station.

FIG. 2 shows elements for providing access to a GSM or UMTS network by both a conventional base station 3 and an access point (AP 20). The AP 20 provides a radio link 21 to mobile terminal 1.

In the first embodiment, the radio link 21 from the AP 20 to the mobile terminal 1 uses the same cellular telecommunication transport protocols as the conventional base station 3 but with a smaller range—for example 25 m. The AP 20 appears to the mobile terminal 1 as a conventional base station, and no modification to the mobile terminal 1 is required to operate with the AP 20. The AP 20 performs a role corresponding to that of a GSM BTS 22 and BSC 26 and/or UMTS Node B and RNC.

Communications between the access point 20 and the core network 12 are IP based communications, and may be, for example, transmitted over a broadband IP network (and routed via the Internet). The communications are routed via MSC 32 or SGSN 34. The access point 20 converts the cellular telecommunications transport protocols used for signaling in conventional GSM or UMTS networks used between the mobile terminal 1 and the AP 20 to IP based signalling.

The connection 23 between the access point 20 and the core network 12 may use the PSTN telephone network. Typically a DSL cable connection connects the access point 20 to the PSTN network. The data is transmitted between the access point 20 and the core network 12 by IP transport/DSL transport (a backhaul connection). The bandwidth of the cable connection between the access point and the telephone exchange is shared with multiple other users (typically between 20 and 50 other users). This means that the speed of transmission of data between the access point 20 and the telephone exchange varies significantly in dependence upon the activities of the other access point devices sharing the connection. Likewise, the route that the data follows between the telephone exchange and the final destination (the network core 12 in this embodiment) will also affect the speed of transmission between the access point 20 and the core network 12.

The access point 20 may be connected to the core network 12 by means other than a DSL cable and the PSTN network. For example, the access point 20 may be connected to the core network 12 by a dedicated cable connection that is independent of the PSTN, or by a satellite connection between the access point 20 and the network core 12. These methods of connecting the access point 20 to the network core 12 suffer from the same limitations as the DSL cable connection to the PSTN network. That is, the connection between the access point and the network core 12 is shared between multiple users and the speed of transmission of data and the quality of the connection is variable, being outside the control of the network core 12.

This variability of transmission speed between the access point 20 and the core network 12 should be contrasted with the much more consistent transmission speed between the conventional base station of a mobile telecommunications network and the core network 12. In a conventional mobile telecommunications network the base station is connected by an exclusive, dedicated connection to the MSC 2/SGSN 16 and network core 12. The connection is not shared with other base stations, and therefore its speed will not depend upon other traffic of other devices.

Using an access point 20 connected to the core network via an IP network does have advantages. Existing broadband DSL connections can be used to link mobile terminals with the network core 12 without using the capacity of the mobile telecommunications network radio access network, or where there is no conventional radio access network coverage. For example, UMTS coverage could be provided by an access point 20 where there is no conventional UMTS coverage (perhaps only GSM coverage).

In accordance with a first embodiment, because the access point 20 appears to a mobile terminal 1 to be a base station that is conventionally connected to the network core 12, it is important that the access point 20 provides a minimum quality of service (QoS) to the user, or they may become dissatisfied with the network.

In accordance with an important feature of this embodiment, the access point 20 is configured to monitor the quality or speed of the link 23 between the access point and the network core 12. The quality or speed is determined to be poor, the present invention provides a mechanism for tending to cause the mobile terminal 1 to register with another base station—that is, to perform handover to that other base station. Briefly, when the measurements made by the access point 20 of the quality or speed of the connection between the access point 20 and the network core 12, is poor, the access point 20 then reduces the transmission power of the radio connection to the mobile terminal 1 and/or deliberately generates or simulates noise in the radio transmissions to the mobile terminal 1. That is, the quality of the radio link between the access point 20 and the mobile terminal 1 is deliberately reduced. This simulates the situation when the mobile terminal 1 nears the edge of the cell served by the access point 20, and causes the mobile terminal to begin the conventional handover procedure to an alternative base station that provides coverage in a different cell.

A mobile telecommunications terminal operating in accordance with the GSM or UMTS Standards, during its idle time slots, scans the Broadcast Control Channel (BCCH) of up to sixteen neighbouring cells. The mobile terminal forms a list of six best cells for possible handover, based on the received signal strength and/or quality (i.e. the error rate in the received signal). The information in this list is passed to the base station (which may be an access point) with which the mobile terminal is currently registered at least once per second, and is, in turn, transmitted to the network core 12. The information list is used by a handover algorithm implemented in the network core 12. The algorithm that determines when handover occurs is not specified in the GSM or UMTS Standards. The algorithms essentially trigger a handover when the current base station provides a received signal at the mobile terminal 1 below a predetermined quality received threshold, and where a better quality signal is available from a neighbouring base station.

As indicated above, in the embodiment the access point may trigger a handover of a mobile terminal registered with it when the quality of the connection 23 between the access point and network core is poor. The access point may monitor the quality of the connection between the access point and the network core 12 by determining the latency—for example, by measuring the time that it takes a data packet to be transmitted between the access point 20 and the network core 12. When the connection 23 is idle, the access point 20 may periodically poll the network core 12 by sending it a predetermined message and determining how long it takes to receive a reply message back. This, of course, provides an indication of the speed of the connection 23 between the access point 20 and the network core 12.

A threshold value may be set which indicates the minimum speed or quality that is acceptable for the link 23 between the access point and the network core 12. Alternatively, rather than a simple threshold value being set, the access point could compare the speed/quality of the communication between the access point 20 and the network core 12 with the quality/speed information that is obtained when the mobile terminal 1 scans the broadcast control channel (BCCH) in the manner described above. The access point 20 receives this information as it passed via the access point to the network core 12 as part of the usual operation of the mobile terminal in accordance with a GSM or UMTS Standards. The access point 20 may be adapted to store this information in the memory location. The access point may then be configured to compare the speed/quality that the access point can provide (in view of the quality of the connection 21 between the terminal 1 and the access point and of the connection 23 between the access point 20 and the network core 12) with the speed/quality of connection available from the neighbouring base stations and to determine whether it would be advantageous to perform a handover operation on this basis.

As discussed above, in a conventional arrangement where radio coverage is provided by a conventional base station connected to the network core 12, signalling between the base station and the network core 12 allows an algorithm provided in the network core 12 to determine when handover should be performed and to coordinate handover to a neighbouring base station by sending appropriate instructions to the mobile terminal (via the base station), to the base station itself and to the MSC of the present cell, and to the base station and MSC of the neighbouring cell to which handover is to occur.

However, in the present embodiment, because the quality of the connection 23 between the access point 20 and the network core 12 is not controlled by the network core 12, and because this connection 23 may not operate at all at some times, it is desired to be able to cause the mobile terminal 1 to handover to a neighbouring base station without requiring any signalling between the access point 20 and the network core 12.

According to the first embodiment of the invention, when it is determined that handover from the access point 20 should occur to a neighbouring base station, the access point 20 reduces the power of the transmitted signal to the mobile terminal 1. This simulates the radio conditions as the mobile terminal 1 moves towards the edge of the cell for which the AP 20 provides radio coverage. Thus, reducing the transmitted power by the access point 20 prompts handover to occur to a neighbouring base station in accordance with the GSM or UMTS Standards.

Reduction of the transmitted power from the access point 20 may be in the pilot channel only, this being the channel whose signal strength is typically monitored to determine when to perform handover. The pilot channel is an unmodulated, direct sequence spread spectrum signal transmitted by a base station or mobile terminal. The pilot channel provides a phase reference for coherent demodulation in addition to providing a means for signal strength comparisons between base stations which is conventionally used when determining when handover should be performed. The power of the other transmission channels may be maintained at the usual level.

According to a second embodiment, the access point 20 deliberately distorts the signals (for example, by introducing artificial noise) before transmitting them to the mobile terminal 1. This simulates worsening conditions in the radio transmissions between the mobile terminal 1 and the access point 20 and prompts, in a similar manner to the first embodiment, handover to occur from the access point to a neighbouring base station in accordance with the GSM or UMTS Standards.

According to a third embodiment, the access point 20 sends a special message to the mobile terminal 1 to cause the mobile terminal 1 to register with a base station different from the access point 20. Preferably, the signalling to cause this handover uses conventional signalling in the GSM or UMTS Standards. For example, the access point 20 may indicate that the location area or routing area occupied by the mobile terminal 1 has changed.

An example will now briefly be described in which the access point 20 indicates to the mobile terminal 1 that the location area occupied by the mobile terminal 1 has changed.

In normal use the access point 20 broadcasts a particular location area identity (LAI) by which the location area occupied by the access point 20 is uniquely identified. Each cell provided by the core network has a cell global identity (CGI) used by a mobile terminal when in the cell. The current CGI occupied by mobile terminal 1 is stored in the core network 12. The CGI is a concatenation of the LAI and a cell identity (CI) and uniquely identifies a given cell. When the mobile terminal 1 initially enters the location area that is served by the access point 20, the access point 20 passes to its associated MSC 32 the CGI of the cell.

Conventionally, when a mobile terminal moves from a first location area to a second location area, the mobile terminal detects that a different LAI (from that stored in the mobile terminal) is being broadcast by the local base station. The mobile terminal then sends a location area update (LAU) request to the core network 12. The request includes the first (current) LAI and the mobile terminal's current temporary mobile subscriber identity (TMSI). The MSC with which the mobile terminal is currently registered then sends a new TMSI to the mobile terminal 1. When the mobile terminal moves from a first (current) location area to a second (new) location area, which is administered by a different MSC, similar steps occur and the different MSC requests user profile information from the original MSC.

Each MSC of the network has a table mapping each LAI to an address of an MSC in the network through which signal traffic for the mobile terminal in the LA identified by the LAI is routed. Thus, each LAI is mapped to the address of a particular MSC.

According to the third embodiment, if the access point wishes to indicate that the location area of the mobile terminal 1 has changed (despite the mobile terminal 1 possibly having not moved relative to the location of the access point 20), the access point 20 generates an LAU ACCEPT message containing a TMSI with a network resource identifier (NRI) value identifying and targeting a different MSC from the MSC 32 with which the access point 20 is connected. For example, the target MSC may be the MSC 2 which is connected to the base station 3. The LAU ACCEPT message contains a LAI corresponding to that of a location area served by the base station 3 and MSC 2.

The mobile terminal 1 accepts the LAU ACCEPT message and stores the further LAI and TMSI. The mobile terminal then compares the received LAI with the LAI stored on the terminal and determines that they are different. The mobile terminal 1 then sends a location area update request to the network core 12 via the access point 20. The request contains the TMSI and the further LAI received in the LAU ACCEPT message. When the access point 20 receives the location area update request it derives the NRI from the TMSI and uses the NRI to route the request to the MSC 2, via the core network 12. Signal traffic from the mobile terminal 1 is thereby transferred from the MSC 32 to the MSC 2. The MSC 2 then identifies the previous MSC, MSC 32, using its table and using the further LAI, which maps the further LAI to the address of MSC 32. MSC 2 then retrieves the mobile terminal's context information from the MSC 32. The MSC 2 now associated with the mobile terminal 1 will then cause the mobile terminal 1 to register with a base station associated with the MSC 2, such as base station 3.

A similar procedure may be used to cause the mobile terminal registered in the different base station to be performed by instructing the mobile terminal to perform a routing area update.

Although potentially disadvantageous for the reasons discussed above, according to a fourth embodiment of the invention, the access point 20 may signal to the core network 12 via the broadband connection to instruct the mobile terminal 1 to handover to a neighbouring base station. When such an instruction is received at the network core 12 from the access point 20, the network core 12 then generates signalling to the terminal 1 to cause the mobile terminal to handover to a base station different from the access point 20. For example, data for determining whether handover should be performed may be retrieved from the mobile terminal 1 in the conventional manner. That is, the mobile terminal transmits a list of the six best cells for possible handover, based on the received signal strength and/or quality as determined during a scan of the BCCH. The list of six best cells is passed from the mobile terminal 1 to the access point 20. Conventionally, the information list is transmitted to the core network 12 and is used by a handover algorithm in the network 12 to trigger a handover. In accordance with a fourth embodiment, the access point 20 may modify the information list received from the mobile terminal 1, prior to passing this to the network core 12. The modification may alter an entry in the list corresponding to the received signal strength and/or quality of the access point 20, and may amend that entry of the list to indicate that the received signal strength and/or quality is worse than it actually is. That is, the information list is modified to simulate a list that might appear as the mobile terminal moves away from the access point 20 towards other base stations that provide a better received signal strength and/or quality. Alternatively, rather than modifying the entry in the information list corresponding to the access point 20, the other entries may be modified to indicate that the received signal strength and/or quality corresponding to those base stations is better than it actually is. Either way, the information is modified to indicate that the received signal strength and/or quality at the access point 20 is relatively poor. When the information list is received from the access point 20, this can be processed by the handover algorithm in the conventional manner. No further modification to the algorithm or the signalling that causes handover is required.

As indicated above, a problem with this fourth embodiment is that, if the broadband connection quality is very poor, such instructions may never reach the network core via the broadband connection.

Some communications between the mobile terminal 1 and the core network 12 are more time critical than others. There are four different quality of service (QoS) classes, or traffic classes, in UMTS:
1. Conversational class
2. Streaming class
3. Interactive class
4. Background class Conversational real-time services, such as a normal voice call or video telephony, are most sensitive to delays. In such a communication class any delay in signalling will generally be unacceptable to the users.

In the real-time streaming class, data flow should be sufficiently fast and reliable for the content to be reproduced live at the mobile terminal 1. This data flow is a one-way transport in which the time relation (variation) between the information entities, samples or packets within the flow is preserved. This class is less time critical than the conversational class because the data transport is one-way, and it is possible that a buffer of data may be maintained in order that real-time reproduction of content may be maintained if there is a temporary delay in data transport to the mobile terminal 1.

Traditional internet applications, such as web browsing, email transmission, FTP and news are the main uses of the interactive and background classes.

In accordance with an optional feature of the system described herein, the access point 20 is able to determine which class of communication is being performed with the mobile terminal 1. If the access point serves multiple mobile terminals, then the class of communication being performed with each mobile terminal may be determined. This (or these) determinations can then be used to assist in making appropriate communication handling and handover decisions.

For example, if it is determined that the quality of the broadband connection between the access point 20 and the core network 12 is poor, the access point 20 might temporarily stop communications in the background class, which would increase the bandwidth available for other communications with mobile terminals that have a higher priority class. For example, if a first mobile terminal is perhaps performing a routine back-up of the photographs stored on that mobile terminal as a background class operation, and another terminal registered with the same access point 20 is participating in a video conference, the access point 20 may temporarily halt the background back-up of the photographs in order to allow the mobile terminal performing the video conferencing to use the full bandwidth of the broadband connection between the access point 20 and the core network 12.

Alternatively, if the quality of the broadband connection between the access point 20 and the network core 12 is determined to be too poor to perform particular classes of communication, the access point 20 cause mobile terminals registered with it which are undertaking such communication classes to handover to a neighbouring base station, where an appropriate quality of service can be provided. Mobile terminals performing less time critical communication classes could remain registered with the access point 20 and perform a relatively low time-delay sensitive communications with a core network 12 via the broadband connection between the access point 20 and the core network 12.

When multiple mobile terminals have registered with an access point, the reduction in the transmitted power of access point will, as well as generally causing mobile terminals registered with the access point 20 to tend to handover to a neighbouring base station, will tend to cause mobile terminals furthest from the access point 20 to perform handover first. This will occur because the power of the reduced power transmitter signal will suffer greater losses during transmission over the greatest distance to the most distant mobile terminals. Consequently, the most distant terminals from the access point 20 will tend to perform handover first. Every time a mobile terminal registered with the access point 20 performs handover to a neighbouring base station, this increases the proportion of the bandwidth of the broadband connection between the access point 20 and the core network 12 for the remaining mobile terminal. Therefore, after handover of each mobile terminal from the access point 20 to a neighbouring base station, the adequacy of the quality of the broadband connection between the access point 20 and the core network 12 should be re-evaluated to determine whether it is sufficient to support the communications from the remaining mobile terminals which are registered with the access point 20.

In the embodiments described above, the access point 20 is configured to appear to the mobile telecommunications device 1 as a conventional base station that communicates with the mobile terminal 1 using GSM or UMTS protocols in accordance with the Standards and the licensed radio spectrum. Alternatively, the access point 20 could communicate with the mobile terminal 1 by any other suitable technology—for example, by a Bluetooth® connection, WiFi or another unlicensed mobile access (UMA) protocol, which allows the GSM or UMTS features to be provided using a non-GSM/USM bearer technology.

The core network 12 may be configured to charge for communication services provided to the mobile terminal 1 on a different basis when the mobile terminal 1 is connected to the core network 12 via an access point 20, rather than a conventional base station.

The access point 20 may be configured to instruct the mobile terminal 1 to display an indication—such as a visual indication, when it is connected to the network core 12 via the access point 20. This may be particularly useful if communication services are charged for on a different basis when the mobile terminal 1 is connected to the network core 12 via the access point 20.

Although in the embodiments described, arrangements for performing a handover from an access point 20 to a conventional base station have been described, the handover from the access point 20 could be to another access point. Also, when a mobile terminal 1 is registered with a conventional base station, handover to an access point, such as access point 20, will be performed without requiring any modification to the underlying signalling that occurs between the mobile terminal 1 and the network core 12. A handover algorithm on the network core 12 will receive the information list of the surrounding base stations (including the access point 20) delivered from the mobile terminal 1 in the usual manner. When the relative quality of the signals from the six best base stations is received and analysed by the handover algorithm on the network core, if it is determined that the access point 20 provides the best radio coverage for the mobile terminal 1, then handover to that access point will be instructed using the conventional underlying signalling between the mobile terminal 1, the base station with which it is currently registered, the access point 20 and the network core 12.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. In a telecommunications network including a radio access network having a plurality of base stations for wirelessly transmitting data between a mobile telecommunications device and the base stations, wherein some of the base stations are connected by cellular telecommunications transport to the telecommunications network and some of the base stations are connected by IP transport to the telecommunications network, a method of de-registering a given mobile telecommunications device from a given IP transport connected base station comprising:
- monitoring, at the given IP transport connected base station, quality of an IP transport connection of the given IP transport-connected base station to the telecommunications network;
- causing, at the given IP transport-connected base station, the given mobile telecommunications device to de-register from the given IP transport connected base station, when the quality of the IP transport connection is poor, by varying quality of the signals transmitted to the given mobile telecommunications device in order to simulate a reduction in quality of a received signal at the mobile telecommunications device.

2. A method of claim 1, wherein the varied quality is the transmit power of the base station.

3. A method of claim 1, wherein the signal is distorted prior to transmission by the base station.

4. A telecommunications network, comprising:
- a radio access network comprising a plurality of base stations for wirelessly transmitting data between a mobile telecommunications device and the base stations, wherein some of the base stations are connected by cellular telecommunications transport to the telecommunications network and some of the base stations are connected by IP transport to the telecommunications network, and wherein at least a given IP transport connected base station is configured to monitor quality of an IP transport connection of the given IP transport connected base station to the telecommunications network and is configured to cause the mobile telecommunications device to de-register with the given IP transport connected base station, when the quality of the IP transport connection is poor, by varying quality of signals transmitted to the mobile telecommunications device in order to simulate a reduction in quality of a received signal at the mobile telecommunications device.

5. The telecommunications network according to claim 4, wherein the mobile telecommunications device is caused to de-register with the given IP transport connected base station and is configured to re-register with a cellular telecommunications transport connected base station.

6. The telecommunications network of claim 4, wherein the given IP transport connected base station is configured to cause the mobile telecommunications device to de-register with the given IP transport connected base station by varying the transmit power of the base station.

7. The telecommunications network of claim 4, wherein the given IP transport connected base station is configured to cause the mobile telecommunications devices to de-register by distorting signals prior to transmission of the signals by the base stations to the mobile telecommunications device.

8. The telecommunications network according to claim 4, wherein the given IP transport connected base station is configured to monitor the class of communication occurring between the mobile telecommunications device and the telecommunications network for the purpose of deciding when to cause the mobile telecommunications device to de-register.

9. The telecommunications network according to claim 7, wherein the IP transport connection to the telecommunications network comprises a DSL broadband connection.

10. The telecommunications network according to claim 4, wherein the radio access network is part of a GSM or UMTS mobile telecommunications network.

* * * * *